Figure 4C:
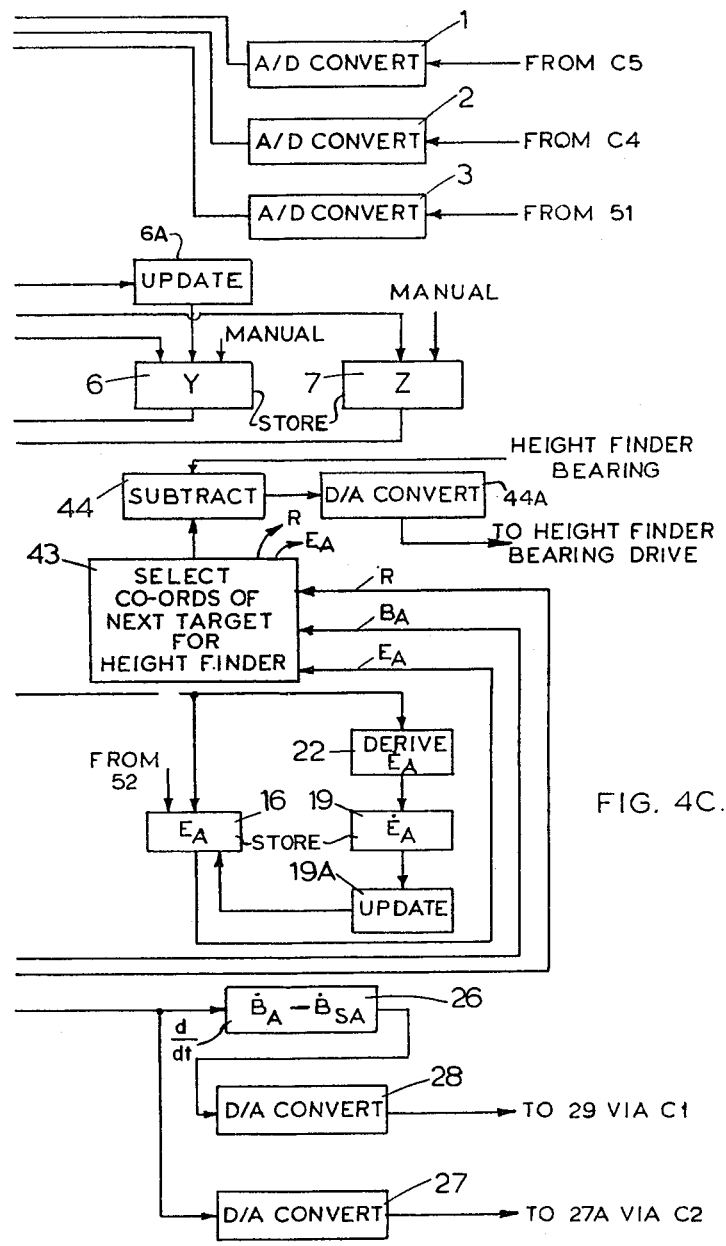

Dec. 14, 1965   R. VOLES   3,223,996
RADAR TRACKING APPARATUS
Filed Dec. 15, 1961   7 Sheets-Sheet 1
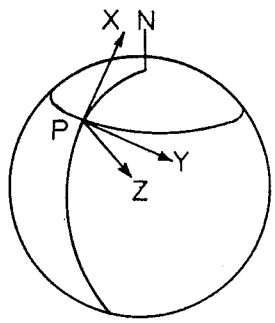
FIG. 1.
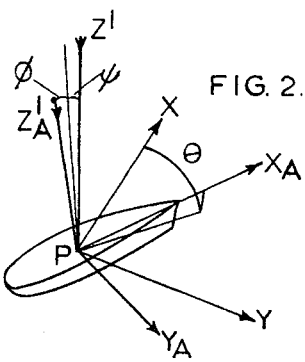
FIG. 2.
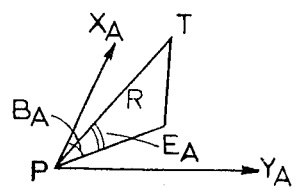
FIG. 3.
FIG. 6.
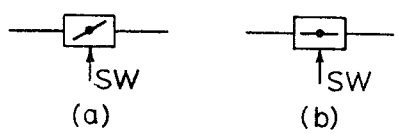
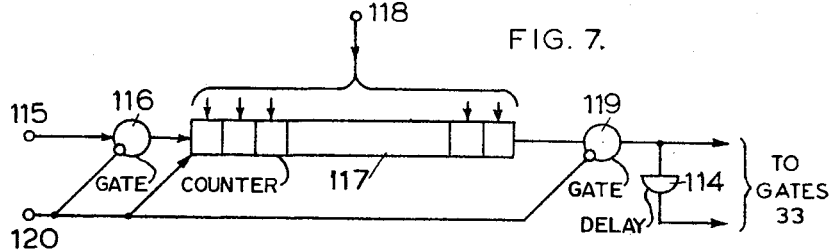
FIG. 7.

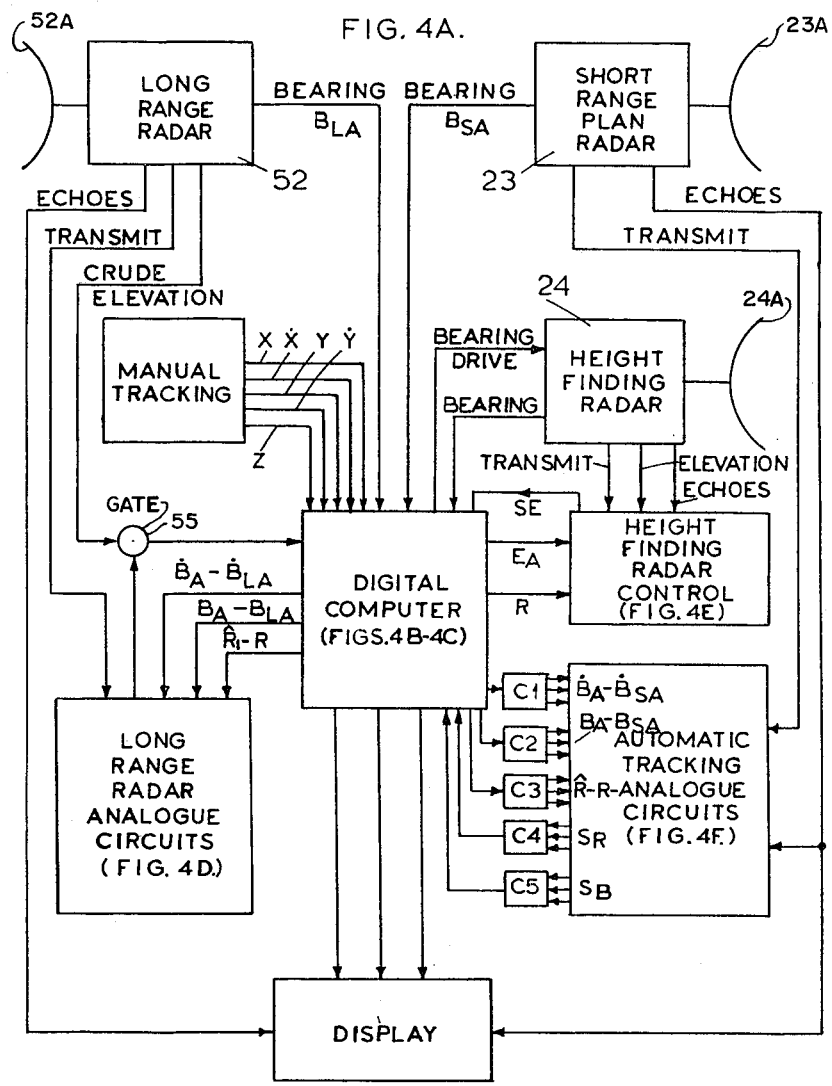

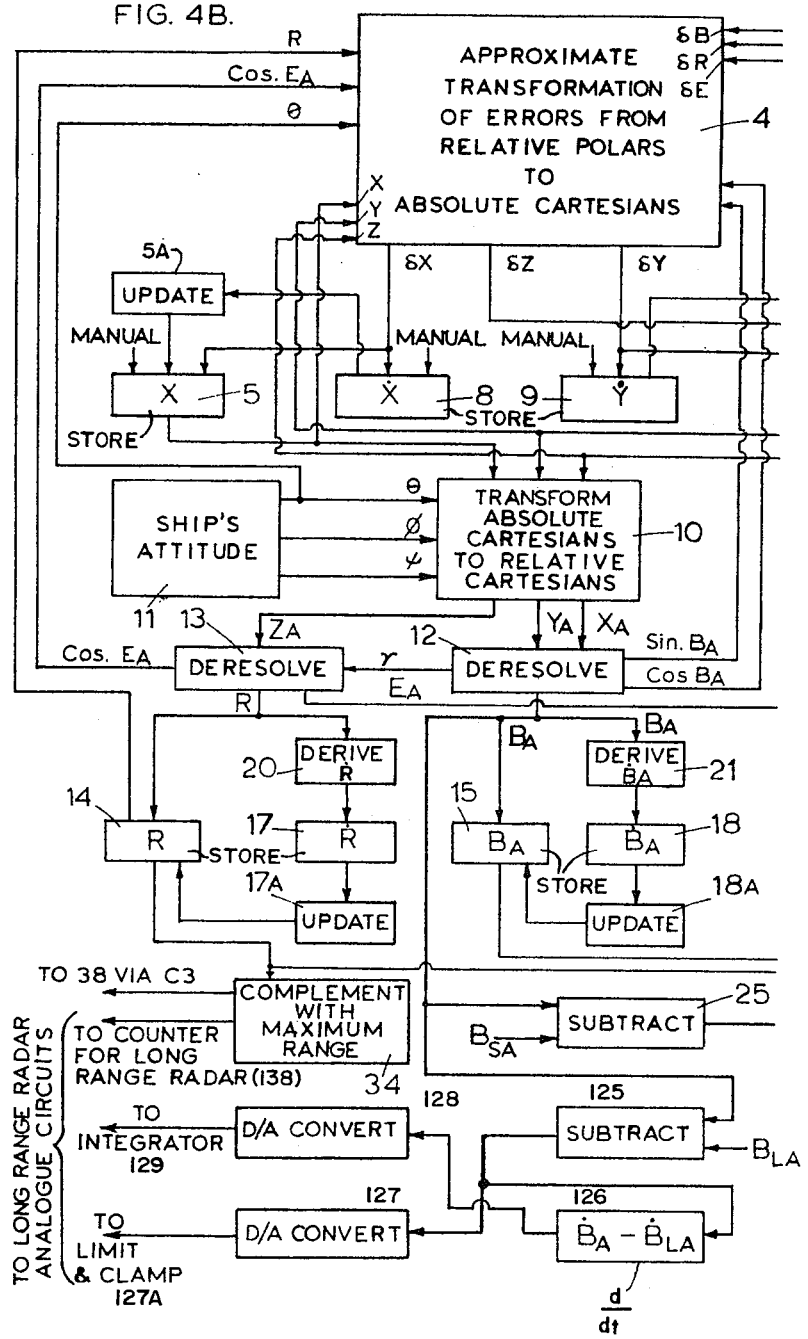

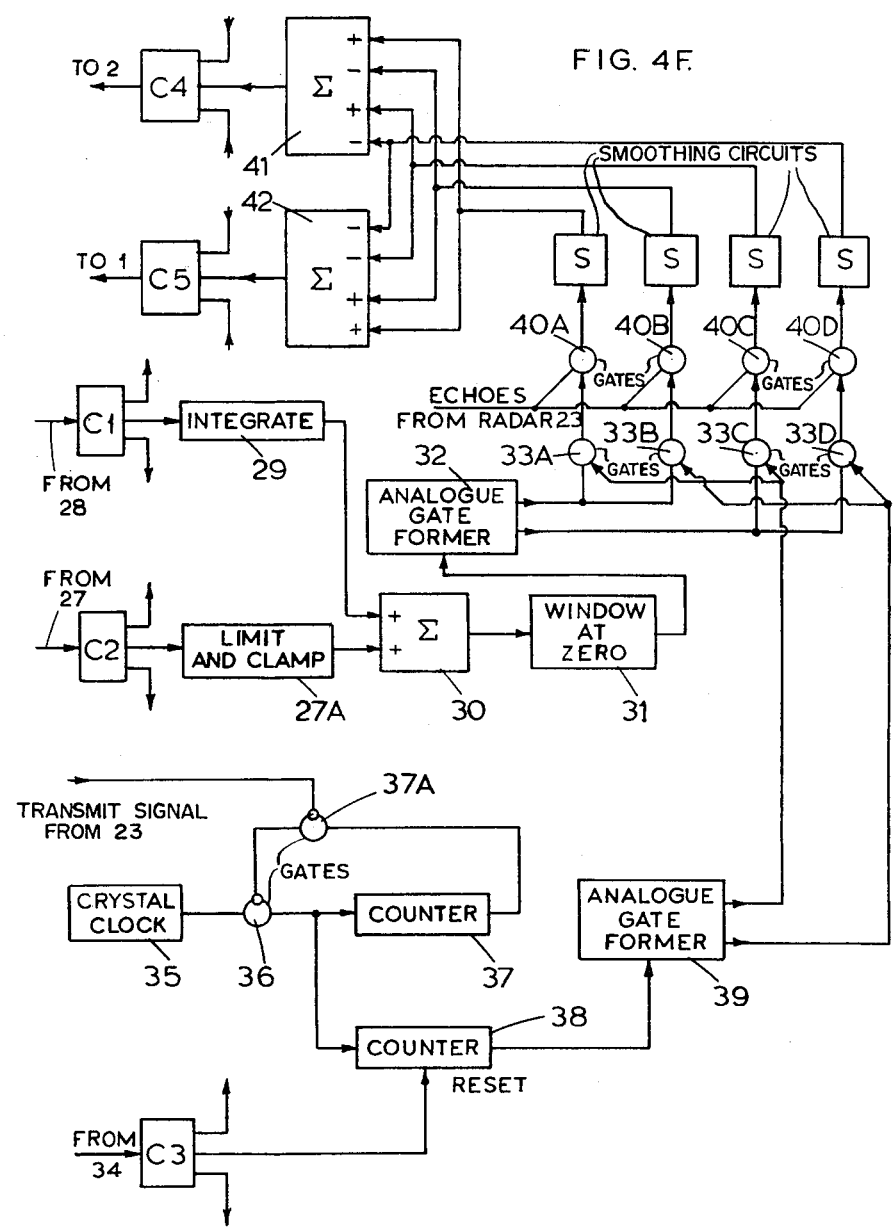

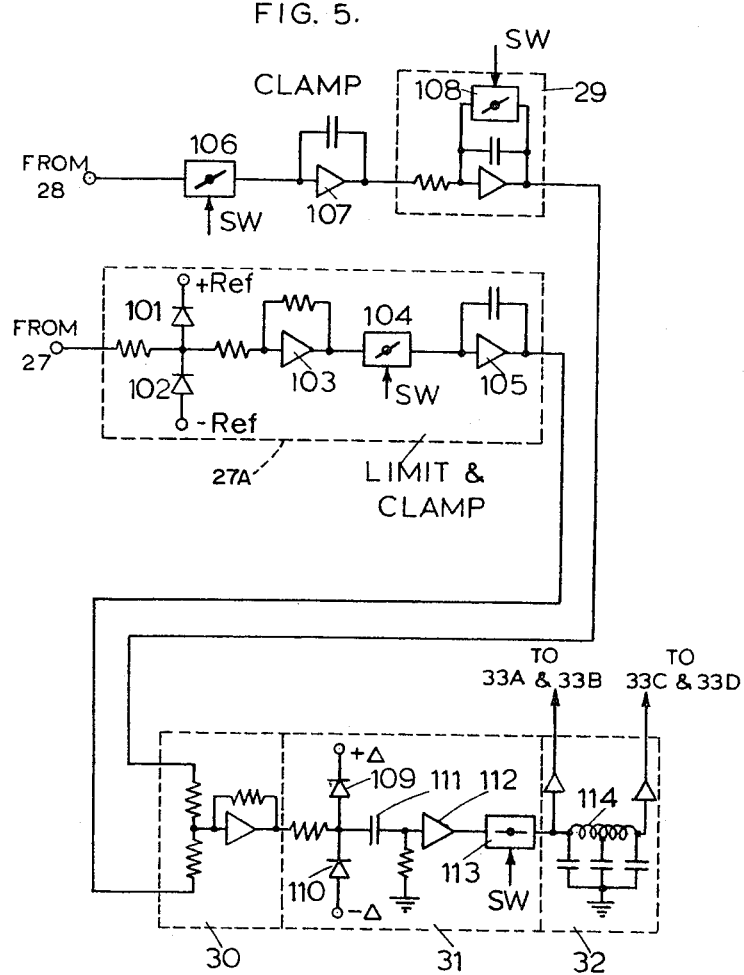

United States Patent Office 3,223,996
Patented Dec. 14, 1965

3,223,996
RADAR TRACKING APPARATUS
Roger Voles, London, England, assignor to Electric & Musical Industries Limited, Hayes, England, a company of Great Britain
Filed Dec. 15, 1961, Ser. No. 159,684
Claims priority, application Great Britain, Dec. 17, 1960, 43,507/60
11 Claims. (Cl. 343—7)

This invention relates to tracking apparatus for tracking one or more co-ordinates of a target which is sampled at intervals, as by radar. The invention applies particularly, though not exclusively, to radar systems for air traffic control.

Due to the increase in speed and numbers of aircraft in recent years, it is essential, from the point of view of safety, to maintain a strict control over the movements of aircraft, particularly in the vicinity of airfields where traffic is densest. The movement of aircraft can be tracked in response to radar signals by automatic tracking apparatus, and the tracking information, after processing, displayed to the operator and also used to control automatic tracking of the aircraft. One factor which affects the accuracy of the radar information is the stability of the mounting of the radar equipment and this is particularly so in shipborne radar which is subject to variations in heading, pitch and roll. Although this problem can be overcome in some cases by stabilizing the platform on which the radar equipment is mounted, this is not always possible, and it is then necessary to use a computer to correct the radar information to compensate for variations in attitude of the radar platform. This would require an extremely high-speed, and inevitably a large digital computer, when a large number of aircraft are being handled, whereas the limited space available on board ship requires that the computer be as small as possible.

The main purpose of this invention is to provide a data-processing system whereby the size and speed of the digital computer may be considerably reduced.

According to the present invention there is provided tracking apparatus comprising input means for deriving successive actual-value signals representing the value of one co-ordinate of a target, digital computing means for producing a succession of discrete predicted-value signals which represent predicted values of said co-ordinate, a plurality of said discrete predicted-value signals being produced in each interval between one of said actual-value signals and the next, and extrapolating means responsive to said discrete predicted-value signals for producing a signal which continues from the last one of said discrete predicted-value signals until a new discrete predicted-value signal is produced, which extrapolated signal represents an effectively continuous prediction of the value of said co-ordinate, said digital computer being responsive to the differences between the values of said co-ordinate values represented by successive actual-value signals and by said extrapolated predicted-value signal at the times of occurrence of actual signals, to produce said discrete predicted-value signals.

Figure 4D:
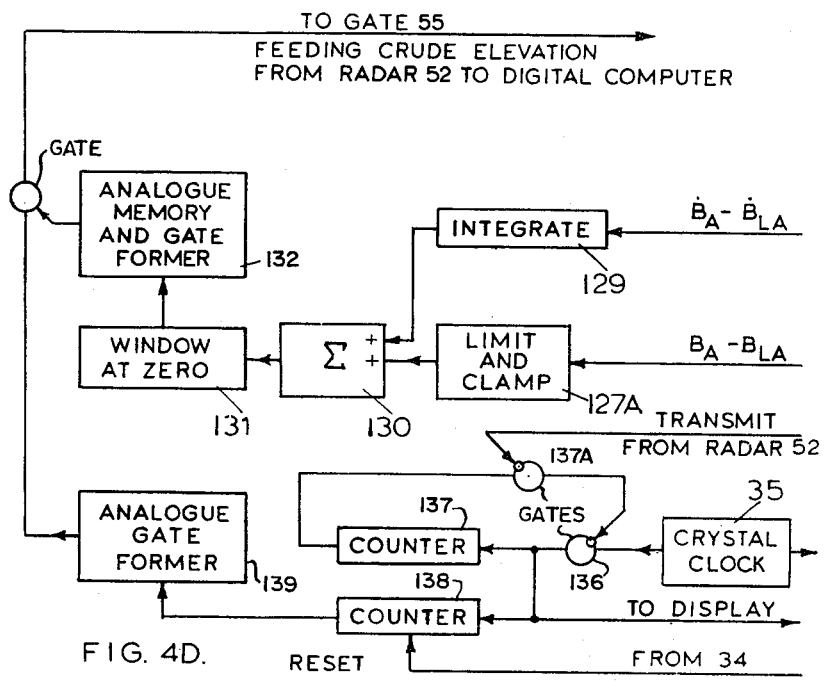
Figure 4E:
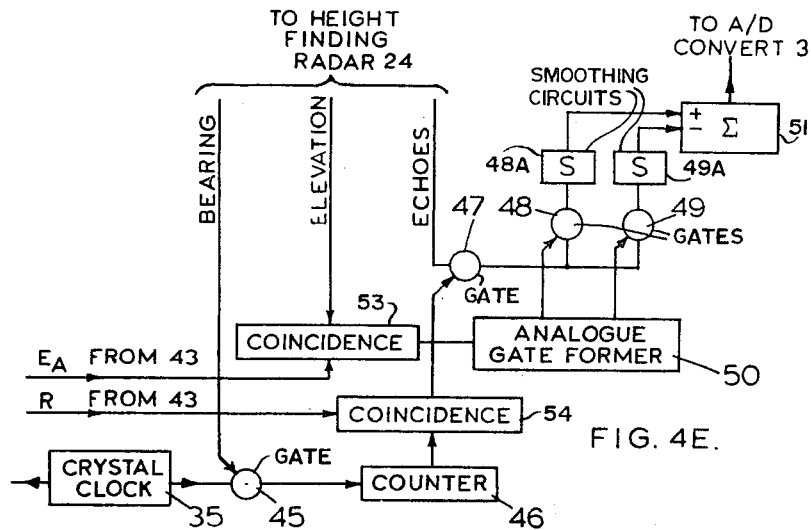

In order that the present invention may be clearly understood and readily carried into effect it will now be described with reference to the accompanying drawings of which:

FIGURES 1, 2 and 3 are explanatory diagrams,
FIGURE 4A is a block diagram of one example of a radar tracking apparatus according to the invention,
FIGURES 4B and 4C together form a flow diagram for the operations performed in the digital computer represented by the central block of FIGURE 4A,
FIGURE 4D is a block diagram of the long range radar analogue circuits,
FIGURE 4E is a block diagram of the height finding radar control circuit,
FIGURE 4F is a diagram of the automatic tracking analogue circuits,
FIGURE 5 illustrates details of parts of FIGURE 4F,
FIGURE 6(a) shows the symbol used in FIGURE 5 for a normally open circuit switch which is closed by the application of a signal SW,
FIGURE 6(b) shows the symbol used in FIGURE 5 for a normally closed circuit switch, which is open circuited by the application of a signal SW, and
FIGURE 7 is a diagram of a modification of part of FIGURE 4F.

The problem is to track a target by means of a radar mounted on an unstabilized vessel at sea. The targets are observed with reference to a spherical frame locked to the deck of the vessel, this spherical frame being referred to as a relative spherical co-ordinate system. These spherical co-ordinates are transformed to Cartesian co-ordinates in a Cartesian frame locked to the deck of the vessel. A further frame of reference, referred to herein as an absolute Cartesian frame, is locked to earth and is therefore related to the relative Cartesian frame by the attitude of the vessel.

The radar system produces information about the targets being tracked with reference to co-ordinates in the relative spherical co-ordinate system, which information is compared with predicted information in this co-ordinate system based on previous observations and error signals are produced from this comparison which are converted to the corresponding errors in the absolute Cartesian system from which a subsequent prediction of the co-ordinates of the target in the relative spherical system is derived.

Referring to FIGURE 1 which shows the absolute Cartesian reference frame on the earth, the X axis is a horizontal line from the point P pointing in a northerly direction, the Y axis is a horizontal line from the point P pointing in an easterly direction and the Z axis is a line from the point P pointing vertically downwards.

FIGURE 2 is a diagram of a sea vessel at the point P having a heading, pitch and roll of $\theta$, $\phi$ and $\psi$ respectively with respect to the absolute reference frame. The axes of the relative Cartesian frame of reference are denoted by the suffix A. The Z' and Z'$_A$ axes are the extensions of the Z and Z$_A$ axes in an upward direction.

The co-ordinates of a point in the absolute Cartesian frame shown in FIGURE 1 may be transformed to the co-ordinates in the relative Cartesian frame according to the well known equations based on the three angles $\theta$, $\phi$ and $\psi$. The spherical co-ordinates of a target T are the apparent bearing B$_A$, the apparent elevation E$_A$ and the range R with reference to the point P, and are shown in FIGURE 3. These three co-ordinates may readily be derived from the relative Cartesian co-ordinates according to the well known trigonometrical principles.

Referring to FIGURE 4A it is to be understood that the central rectangle represents a digital computer, the structure of which is not shown in the figures and will not be described since it may take any well known form. In one example of the invention the computer is a SAAB 2 computer. The blocks included within FIGURES 4B and 4C are intended to represent a series of functions in the form of a flow diagram for data through the digital computer achieved by suitable programming. This series of functions is performed in time multiplex manner for a plural number, 20 in this example, of tracking channels. The digital computer feeds the outputs to analogue extrapolating means, there being individual extrapolating means for each tracking channel. In the following description only a single tracking channel, digital and analogue, will be considered for simplicity.

Referring to FIGURE 4A, three radar equipments are used in the example of the invention shown, a short range radar 23, a height finding radar 24, and a long range radar 52. These radar equipments include aerials 23A, 24A and 52A respectively. Analogue circuits for carrying out the automatic tracking respond to the returns from the short range radar and depend on calculations performed in the digital computer. Similarly the height finding radar 24 is associated with analogue control circuits which depend on calculations performed in the digital computer. The long range radar 52 also is associated with analogue circuits. The returns from both long and short range radars are displayed in conventional manner by cathode ray tubes included in the lowermost block of the figure marked "DISPLAY" with reference to the absolute Cartesian frame and therefore depend on the outputs of the digital computer. An operator observing the displays from the long range radar operates manual tracking controls which feed values into the digital computer and place a marker on the displays.

A new target is first picked up on the long range radar 52 and appears on the corresponding display. The operator sets the manual tracking controls so that a marker on the display follows the new target, thus values are stored in the computer corresponding to the absolute Cartesian co-ordinates of the new target. The radar 52 supplies a bearing signal $B_{LA}$ to the computer which indicates the direction in which the aerial 52A is pointing. From the manual tracking information the computer calculates the apparent bearing $B_A$ of the target so that a signal representing the difference between the target bearing $B_A$ and the aerial bearing $B_{LA}$ may be produced. Also a signal representing the velocity of this difference is produced equal to $\dot{B}_A - \dot{B}_{LA}$. The computer also produces a signal representing a complement of the range of the target R with respect to the maximum range of the long range radar $\hat{R}_1$. Thus three signals, the first two of which are in analogue form, are applied to the long range radar analogue circuits. A signal from the long range radar 52 indicating that a radar pulse has been transmitted is also applied to these analogue circuits, in which, at a time depending on the range R of the target, after the transmission of a radar pulse when the difference between the bearing $B_{LA}$ of the aerial 52A and the apparent bearing of the target $B_A$ is zero, a pulse is applied to open the gate connecting the radar 52 to the digital computer to indicate the elevation of any echo occurring at that bearing and that range. Thus information as to the approximate elevation of the target is inserted into the digital computer.

When the target comes within range of the short range radar the operator arranges for an automatic tracking circuit to take over the tracking of the target. The bearing $B_{SA}$ of the aerial 23A is fed through the radar 23 into the digital computer so that a signal $B_A - B_{SA}$, representing the difference between this bearing and apparent bearing of the target as predicted by the digital computer, is produced by the digital computer and applied to the tracking circuits. In addition a signal $\dot{B}_A - \dot{B}_{SA}$ representing the time differential of the bearing difference signal is also applied to the tracking circuits. These last two signals are both in analogue form.

A digital signal $\hat{R} - R$ representing the complement of the range R of the target as predicted by the digital computer with respect to the maximum range $\hat{R}$ of the short range radar is also applied to the tracking circuits. A signal indicating that a radar pulse has been transmitted by the short range radar 23 is also applied to the tracking circuits as are the echoes from the radar. The tracking circuits include four gates, one corresponding to each quadrant about the predicted apparent position of the target. The return pulse from the radar passes in different proportions through the four gates depending on which of the quadrants the target lies, thus setting up the signals $\delta R$ and $\delta B$ representing the error in range and bearing respectively, which are applied to the computer to correct the values stored therein. Since the digital computer operates sequentially on a number of targets but an individual target circuit is provided for each target commutating circuits C1, C2 . . . C5 are provided to carry out the switching between the two circuits and the computer.

The aerial 24A of the height finding radar 24 is driven to the apparent bearing $B_A$ of the targets under control of the automatic tracking circuits in sequence. When at one such bearing the aerial is swung through a range of elevation angles so that the elevation of a target may be accurately determined. The control circuits for the height finding radar include a pair of gates of which one only is open and which exchange states when the elevation of the aerial 24A is equal to the apparent elevation as predicted by the analogue control circuits. The proportions of the echo pulse from the target which pass through the gates determine the error $\delta E$ of the elevation which is fed back to correct the value stored in the computer.

Referring to FIGURES 4B and 4C together, the errors in bearing, range and elevation $\delta B$, $\delta R$ and $\delta E$ for any one channel are derived in digital form from analogue to digital converters 1, 2 and 3 respectively and are applied as an input to the digital computer which converts them by means of the transformation operation indicated by the block 4 to the corresponding errors in absolute Cartesian co-ordinates $\delta X$, $\delta Y$ and $\delta Z$. This transformation is an approximate transformation in which only the bearing angle $\theta$ is taken into account since the pitch and roll angles $\phi$ and $\varphi$ will be less than 20° and therefore because the errors are relatively small the changes in the errors involved by ignoring the effects of pitch and roll may be neglected.

The absolute Cartesian co-ordinates X, Y and Z of the target are stored in the digital computer by the functions represented by blocks 5, 6 and 7 respectively. Other storage locations represented by blocks 8 and 9 store the rates of change of X and Y with respect to time, that is $\dot{X}$ and $\dot{Y}$, respectively, which are evaluated by the digital computer. The transformed errors $\delta X$, $\delta Y$ and $\delta Z$ are used to correct the values of X, Y and Z in the stores 5, 6 and 7 and to produce amended values for $\dot{X}$ and $\dot{Y}$ in 8 and 9. The computer is programmed to update the values of X and Y in 5 and 6 by means of the values $\dot{X}$ and $\dot{Y}$ in 8 and 9 respectively every 1 tenth of a second as indicated by blocks 5A and 6A, the same operation being performed for information relating to every target in time multiplexed manner. In this way, the values of X and Y are linearly extrapolated so as to predict values for X and Y.

The values of the co-ordinates X, Y and Z derived from locations 5, 6 and 7 are transformed into the relative Cartesian co-ordinates $X_A$, $Y_A$ and $Z_A$ by means of the operation represented by the block 10 which responds to the values of the $\theta$, $\phi$ and $\psi$ derived from instruments represented by the block 11 which measures the attitude of the vessel. From the values of $X_A$ and $Y_A$ are derived the apparent bearing angle $B_A$, the horizontal component $r$ of the range and the sine and cosine of the apparent bearing angle $B_A$ by means of the operation represented by the block 12. A further operation represented by block 13 responds to $Z_A$ and $r$ to produce the true range R, the apparent elevation of the target $E_A$ and the cosine of $E_A$.

The range R, apparent bearing $B_A$ and apparent elevation $E_A$ are stored in the computer at locations represented by the blocks 14, 15 and 16 respectively, and their respective derivatives with respect to time, $\dot{R}$, $\dot{B}_A$ and $\dot{E}_A$ are stored at locations represented by the blocks 17, 18 and 19. The values of $\dot{R}$, $\dot{B}_A$ and $\dot{E}_A$ are used to update the values of R, $B_A$ and $E_A$ respectively by means of the operation represented by the blocks 17A, 18A and 19A every 1/10 of a second. In this way, the values of R, $B_A$ and $E_A$ are linearly extrapolated in discrete steps every 1/10 of a second. $\dot{R}$, $\dot{B}_A$ and $\dot{E}_A$ are derived from the values of R, $B_A$ and $E_A$ produced by the operations 12 and 13, by means of the operations represented by the blocks 20, 21 and 22 respectively, each operation forming the difference between the last two measured values of the respective variable.

Two radar equipments are used in the operation of the automatic-tracking circuits, the first one a short range plan radar represented by the block 23 and a height finding radar represented by the block 24. The radar 23 is of the normal plan radar type having a rotating aerial 23A which rotates at approximately 10 r.p.m. The direction in which the aerial is operative is referred to as the bearing of the radar and is represented by $B_{SA}$. This bearing $B_{SA}$ is subtracted from the bearing $B_A$ derived from the block 12 in the operation represented by block 25 so as to produce a signal representing the difference between these two bearings. This signal which is in digital form is converted to analogue form in the block 27 and appears as an output of the digital computer. From the digital signal produced by the block 25, an operation represented by the block 26 derives the rate of change with respect to time of this signal $(\dot{B}_A - \dot{B}_{SA})$, in digital form, this being converted to analogue form by the conversion operation represented by block 28, the output signal of which forms another output of the digital computer.

The outputs from the digital computer as a result of the conversion operations 27 and 28 are applied to the analogue signal extrapolating means comprising blocks 27A, 29 and 30 of FIGURE 4F. Referring now to FIGURE 4F, the output of the block 28 is integrated by the analogue integrator 29 and added to the output of the converter 27 after passage through the limit and clamping circuit 27A by means of the adding circuit 30 so as to form a continuous prediction of the value of $(B_A - B_{SA})$. The output of the circuit 30 is applied to a window circuit 31 which is arranged to produce an output signal just before the output of the adding circuit 30 passes through zero, that is to say when it is predicted that $B_A = B_{SA}$. The output signal of the circuit 31 is applied to a gating signal generator 32 which produces two gating signals, one on receipt of the pulse of the signal from the circuit 31 and the second a short time afterwards, the transition taking place at the time at which $B_A = B_{SA}$. These gating signals are applied in the manner shown in the drawing to the gates 33A, 33B, 33C and 33D.

Since $B_{SA}$ changes over the entire range of bearing angles, i.e. 360°, as the aerial of the radar 23 rotates, the difference between $B_A$ and $B_{SA}$ will be large for most of the cycle and it is desirable to limit the signal representing $(B_A - B_{SA})$ so as not to overload the summing circuit 30 which is arranged to have a high sensitivity. The limitation is performed in the limiting and clamping circuit 27a. The function of the clamp is to set the zero level for the summing circuit after it has been connected to the analogue to digital converter 27 by the commutator C2.

The range signal R from storage represented by the block 14 in the digital computer (FIGURE 4B) is processed by the function represented by the block 34 for the purpose of producing the complement of the range with respect to the maximum range $\hat{R}$ of the short range radar 23. A source of clock pulses 35 is connected via a gate 36 to a counter 37, the output of the counter 37 which indicates that the counter is full is connected to the input of the gate 37a, the output of which gate is connected to inhibit the passage of signals through the gate 36 so as to stop the supply of clock pulses to the counter 37 when it is full. In the absence of a "transmit" signal from the radar 23 the counter 37 remains full and the gate 36 remains closed. When a radar pulse is transmitted by the radar 23 a signal is simultaneously applied to inhibit the passage of signals through the gate 37A so that the gate 36 is able to pass clock pulses from the clock 35 to the counter 37. The first clock pulse after the gate 36 is opened resets the counter 37 to the empty condition and the counter is then able to count the clock pulses. A further counter 38 is set initially to the complement of the range R from the digital computer as a result of the function represented by block 34 and then counts the pulses transmitted by the gate 36. Both counters 37 and 38 are of such capacity that they are filled from the empty state by the clock pulses from 35 in just less than the time taken for an echo to return from the target of maximum range $\hat{R}$ of the radar 23. An output signal is derived from the counter 38 when this counter is full indicating that an echo from a target at the predicted range will shortly be due since the counter was initially set to a value representing the complement of the predicted range R with respect to the maximum range $\hat{R}$, and is applied to a gating signal generator 39 which is similar to the generator 32 and produces an output signal on one output line on receipt of an input signal and on the second output line after a very short delay. The end of the signal on the one output line and the start of the signal on the second line occur simultaneously with the time for an echo from the predicted range R. These outputs are applied to the gates 33A—33D to enable them to pass signals. The counter 37 is provided within the digital computer, but there is a counter 38, apart from the digital computer, for each tracking channel.

The operation of the generators 32 and 39 in conjunction with the gates 33A to 33D serves to divide a small area about a predicted position of the target into four quadrants. The echoes received from the radar 23 are applied to one input of the gates 40A, 40B, 40C and 40D. As explained earlier the time of the output signal from the window 31 is arranged to occur just before the predicted time of arrival of the echo relating to a particular target as the bearing $B_{SA}$ changes and by means of the generator 32 opens the gates 33A and 33B or 33C and 33D in a particular order. The time of opening of the gates and therefore which gates are open when an echo is received depends on whether the echo has a bearing larger or smaller than the value $B_A$ predicted by the computer. In a similar way the generator 39 passes signals to the gates 33A and 33C or 33B and 33D at a time depending on the range of the target and therefore which gates are open when an echo is received depends on whether the target is nearer to or further from the vessel than the value R predicted by the computer. Therefore the proportions of the echo pulse transmitted by the gates 40A, 40B, 40C and 40D provides the information as to how far the target is from the predicted position and in what direction. Each of the gates 40A, 40B, 40C and 40D represents one quadrant in the plan view of the area about the target.

The outputs of the gates 40A, 40B, 40C and 40D are integrated with respect to time in the blocks S so that the magnitude of the signals represents the extent to which the respective gates were open when the echo pulse arrived, and are applied to two summing circuits 41 and 42, in such a way that the output of the circuit 41 is an analogue signal representing the error δR in the range R and the output of the circuit 42 is an analogue signal representing the error δB in the bearing $B_A$. These two outputs are applied to the analogue to digital converters 2 and 1 respectively.

Referring now to FIGURE 4D which shows the analogue circuits for the long range radar 52, it will be noticed that the circuit arrangement closely resembles that of FIGURE 4F, the short range radar analogue circuits; components of FIGURE 4D having functions which correspond with those of FIGURE 4F have reference numbers which are increased by 100. From the digital computer as a result of the digital to analogue conversion operation 127 analogue signals representing $B_A - B_{LA}$ are applied via a limiting and clamping circuit 127A to one input of the adder 130. The analogue signal representing $\hat{R}_1$ of the radar 52. A digital signal representing $\hat{R}_1 - R$ of the operation represented by the block 128 is applied via the integrator 129 to the second input of adder 130. The output of the adder 130 is passed to a window circuit 131 at ground potential, the output from which is applied to the analogue memory and gate former circuit 132. The crystal clock pulse generator 35 which also appears in FIGURES 4E and 4F is connected via a gate 136 to the input of counters 137 and 138. A signal from counter 137 indicating that it is full is applied via the gate 137A to inhibit a passage of signals from the gate 136. A pulse coincident with the emission of a radar pulse from the radar 52 is applied to the gate 137A to inhibit the passage of signals therethrough. The counter 138 produces an output signal which indicates that the counter is full, which signal is applied to the analogue gate former 139, the output from which in the presence of an output from the circuit 132 is applied to enable the passage through gate 55 of a signal representing the crude elevation from the long range radar 52 into storage in the digital computer represented by the block 16 of FIGURE 4C. The counters 137 and 138 both have the same capacity and are such that they are filled by pulses from the clock 35 in the period of time for the echo of a pulse from the radar 52 to return from a target at the maximum range $\hat{R}_1$ of the radar 52. A digital signal representing $\hat{R}_1 - R$ from the function 34 of the digital computer (FIGURE 4B) is applied to reset the counter 138 so that the counter 138 is filled from the block 35 in the time taken for an echo to return from a target at range R.

In a similar manner to that described with reference to FIGURE 4F the output of the adder 130 sweeps through a series of values of $B_A - B_{LA}$ extrapolated from the last discrete value produced from the digital computer. When the output of the adder 130 passes through zero indicating that the bearing of the aerial 52 is equal to the bearing $B_A$ of the target the window circuit 131 generates a signal which causes the circuit 132 to generate an output pulse.

When the radar 52 emits a pulse, signals from the clock 35 are applied to the counters 137 and 138 and when the counter 138 is filled, after a time corresponding to that for a radar echo from a target at range R, the counter 138 emits a pulse which is transmitted by the circuit 139 to the gate controlled by the circuit 132. This gate will allow a pulse to be transmitted, if the bearing of the aerial 52A is equal to $B_A$, and a pulse is only applied to the gate at the time of an expected return from a target at range R. Therefore, crude elevation information from the radar 52 is applied to the digital computer for any target having the bearing $B_A$ and range A.

Referring now to FIGURES 4A, 4C and 4E together. The aerial 24A of the height finding radar 24 is driven to a particular bearing and is then caused to transmit a succession of radar pulses and provides information as to the elevation of the echoes at the bearing.

The operation represented by the block 43 in the digital computer selects values of R, $B_A$ and $E_A$ relating to the next target to be examined by the height finder, the digital computer being programmed to select the targets in cyclic order. The value $B_A$ is compared in 44 with the bearing at which the radar 24 is set and in block 44A the difference so formed is converted to an analogue signal to drive the radar aerial 24A to the given value of $B_A$. At this bearing when the radar 24 transmits a pulse gate 45 is opened passing clock pulses from the clock 35 to a counter 46. When the number in the counter 46 coincides with the given range R a pulse is emitted by coincidence circuit 54 which opens a gate 47 thereby allowing the echoes from the radar 24 to be applied to the inputs of two further gates 48 and 49. The elevation of the aerial 24A of the radar 24 as it varies is compared with the predicted value of $E_A$ from 16 and just before coincidence the circuit 53 passes a control pulse to a gating signal generator 50. The generator 50 produces two output pulses, one to open the gate 48 on receipt of the pulse produced just before the coincidence of the predicted value of $E_A$ and the elevation of the radar 24 and a second pulse to open the gate 49 a short time afterwards the transition from the one pulse to the other taking place when the elevation of radar 24 is exactly equal to $E_A$. Two smoothing circuits S, 48A and 49A, smooth the outputs of the gates 48 and 49 and pass them to an analogue adding circuit 51 so that the output of the circuit 51 represents the error in the value of $E_A$. This signal is converted in the analogue to digital converter 3 to form the digital signal $\delta E$.

FIGURE 5 shows in more detail the circuitry for performing the analogue functions represented by the blocks 27A, 29, 30, 31 and 32, the outlined areas bearing the same reference numbers as the corresponding components in FIGURE 4F.

The analogue signal representing $(B_A - B_{SA})$ produced by the digital to analogue converter 27 is limited by the diodes 101 and 102 and then inverted by the amplifier 103. The inverted signal is then applied by a switch 104 and a clamp 105 to one input of the summing circuit 30. The analogue signal representing $(\dot{B}_A - \dot{B}_{SA})$ is derived from the converter 28 and applied via the switch 106 and the clamp 107 to the input of the integrator 29. The integrator 29 includes a resetting switch 108, the function of which is to discharge the integrating condenser. The output of the integrator 29 is connected to the second input of the summing circuit 30.

The sum of the two signals applied to the circuit 30 appears at the output terminal of the circuit and is fed to the window circuit 31 which comprises the two diodes 109 and 110. These diodes are biased off by small reference voltages $+\Delta$ and $-\Delta$. The junction of the diodes 109 and 110 is connected via a condenser 111 to the input of an amplifier 112. The potential of the junction of the diodes 109 and 110 will remain at one or other of the small reference voltages because of the presence of the diode 109 and 110 until the sum output of the circuit 30 becomes sufficiently close to zero as to cause the potential of the junction of the diodes to move from one of the limiting values. This change in potential is amplified by the amplifier 112 and appears as a pulse which is applied by the switch 113 to the gating signal generator 32. The gating signal generator 32 includes a delay element 114, the function of which is to produce the delayed gating pulses for the gates 33C and 33D as described above.

The symbols used in FIGURE 5 are all conventional symbols with the exception of that used for the switches. FIGURE 6A shows the symbol for a switch which is normally open circuited but which is closed by the application of a switching signal SW. FIGURE 6B shows the symbol used for a switch which is normally closed and is open circuited by the application of a switching signal SW. The switching signals SW used in FIGURE 5 may conveniently be derived from the digital computer to occur when the particular circuit is being reset in response to outputs from the digital computer before the beginning of a new extrapolation.

Alternatives to the analogue extrapolating circuit described above may readily be devised when it is appreciated that the operation of the circuit takes the form of a linear decrement of voltage from the value $(B_A - B_{SA})$ at a rate equal to $(\dot{B}_A - \dot{B}_{SA})$, the output signal being produced when the zero level of voltage is reached. According to one modification the value $(B_A - B_{SA})$ may be replaced by a fixed value of one and the rate of decrement modified to be $-(\dot{B}_A - \dot{B}_{SA})/(B_A - B_{SA})$. According to another modification the rate of decrement of the voltage is maintained at a steady value of $-1$ but the value from which the decrement takes place is modified to be $-(B_A - B_{SA})/(\dot{B}_A - \dot{B}_{SA})$. $(\dot{B}_A - \dot{B}_{SA})$ is roughly constant and does not approach zero.

This second modification may readily be carried into effect by means of the arrangement shown in FIGURE 7 having a counter 117 which has a capacity greater than the maximum value of $-(B_A - B_{SA})/(\dot{B}_A - \dot{B}_{SA})$ which can occur. Clock pulses from the block 35 appear at the input terminal 115 and are passed via the gate 116 to the counter 117. When the counter 117 is full an output pulse is produced which is transmitted via the gate 119 to the gating signal generator 32. Digital signals derived from the computer are applied via the terminal 118 to reset the counter to the complement of $-(B_A - B_{SA})/(\dot{B}_A - \dot{B}_{SA})$ with respect to the capacity of the counter. In this way the number in the counter represents a predicted value of $(B_A - B_{SA})$ which varies in discrete steps of $\dot{B}_A - \dot{B}_{SA}$ with the clock pulses from the clock 35.

If desired the linear extrapolation described above may be replaced by higher order extrapolation for example, parabolic or cubic, both in the digital computer operations and in the analogue operations.

In a modification of the invention, digital units which may operate in serial mode could be used for extrapolation. Furthermore, although the accuracy of the information provided by the extrapolation means is limited, errors are non-cumulative, as the extrapolation means are provided with accurate information from the computer every 0.1 second.

It will be understood that the various rates of operation specified above may differ in different radar installations, and depend upon the absolute accuracy required in any particular case.

What I claim is:

1. Tracking apparatus comprising input means for deriving successive actual-value signals representing the value of one co-ordinate of a target, digital computing means for producing a succession of discrete predicted-value signals which represent predicted values of said co-ordinate, a plurality of said discrete predicted-value signals being produced in each interval between one of said actual-value signals and the next, and extrapolating means responsive to said discrete predicted-value signals for producing a signal which continues from the last one of said discrete predicted-value signals until a new discrete predicted-value signal is produced, which extrapolated signal represents an effectively continuous prediction of the value of said co-ordinate, said digital computer being responsive to the differences between the values of said co-ordinate represented by successive actual-value signals and by said extrapolated predicted-value signal at the times of occurrence of actual value signals, to produce said discrete predicted-value signals.

2. Tracking apparatus according to claim 1, in which said extrapolating means is an analogue circuit.

3. Tracking apparatus according to claim 2, comprising a plurality of said analogue extrapolating means, first commutating means for commutating discrete predicted-value signals, produced by said digital computing means, in cyclic order to the individual analogue extrapolating means; individual error sensing means, one for each analogue extrapolating means, for producing an error signal responsive to differences between the co-ordinate values represented by selected actual-value signals and by the extrapolated predicted-value signal produced by the respective extrapolating means at the times of occurrence of the selected actual-value signals, and second commutating means for commutating error signals from the individual error sensing means to said digital computing means, whereby said digital computing means can be arranged to produce discrete predicted-value signals for the individual extrapolating means in time multiplexed manner.

4. Tracking apparatus according to claim 3 wherein said digital computer is arranged to produce predicted-value signals for the individual extrapolating means in time multiplexed manner.

5. Tracking apparatus according to claim 1, wherein said input means comprises radar transmitting and receiving means, said radar means being mounted on an unstabilised platform the attitude of which is liable to vary relative to a reference co-ordinate frame, and means are provided for deriving signals which vary with variations in the attitude of said platform relative to said reference frame, whereby said digital computing means can be arranged to produce said discrete predicted-value signals so as to represent predicted values of said co-ordinate relative to a co-ordinate frame fixed to said platform.

6. Tracking apparatus according to claim 5 wherein said digital computing means is arranged to produce discrete absolute predicted-value signals which represent predicted values of one or more co-ordinates of said target relative to said reference frame, and is arranged to convert said discrete absolute predicted-value signals into said discrete relative predicted value signals.

7. Tracking apparatus according to claim 5 wherein said radar means is arranged to provide signals which by their time of occurrence relative to transmitted pulses represent range and bearing co-ordinates of a target, said digital computing means being arranged to produce absolute discrete predicted-value signals representing cartesian co-ordinates of the target relative to said reference frame, and being arranged to convert said absolute discrete predicted-value signals into relative discrete predicted-value signals representing the range and bearing of the target relative to the constant frame attached to said platform, said extrapolating means being provided to respond only to said relative discrete predicted-value signals.

8. Tracking apparatus according to claim 6 comprising display means for producing a display in response to said discrete absolute predicted-value signals.

9. Tracking apparatus according to claim 5 wherein said input means comprises plan radar means arranged to scan cyclically through a range of bearing angles for deriving actual value signals which by their timing relative to transmitted pulses represent the range and bearing of a target, and elevation radar means for deriving actual value signals which by their timing relative to transmitted pulses represent the elevation of a target, said elevation radar means being arranged to be servo-driven to selected bearings and to search in elevation for a target at a predetermined range.

10. Tracking apparatus according to claim 5 wherein said radar means is arranged to provide signals which by their time of occurrence relative to transmitted pulses represent range and bearing co-ordinates of a plurality of targets, said digital computing means being arranged to produce absolute discrete predicted-value signals representing cartesian co-ordinates of each target relative to said reference frame, and being arranged to convert said absolute discrete predicted-value signals into relative discrete predicted-value signals representing the range and bearing of each target relative to the constant frame attached to said platform, said extrapolating means being provided to respond only to said relative discrete predicted-value signals.

11. Tracking apparatus according to claim 5 wherein said input means comprises plan radar means arranged to scan cyclically through a range of bearing angles for deriving actual value signals which by their timing relative to transmitted pulses represent the range and bearing of a plurality of targets, and elevation radar means for deriving actual value signals which by their timing relative to transmitted pulses represent the elevation of a plurality of targets, said elevation radar means being arranged to be servo-driven to selected bearings and to search in elevation for a target at a predetermined range.

References Cited by the Examiner

UNITED STATES PATENTS

| | | | |
|---|---|---|---|
| 2,564,698 | 8/1951 | Knowles et al. | |
| 3,054,101 | 9/1962 | Pastoriza | 343—7 |
| 3,064,250 | 11/1962 | Close | 343—7 X |
| 3,126,538 | 3/1964 | Byerly et al. | 343—7 |
| 3,151,322 | 9/1964 | Hildebrandt | 343—7 X |

CHESTER L. JUSTUS, *Primary Examiner.*